March 1, 1932.  H. C. HARRISON  1,847,181
TALKING MOTION PICTURE SYSTEM
Original Filed Dec. 27, 1923  5 Sheets-Sheet 1

Inventor:
Henry C. Harrison
by Joel C.K. Palmer Atty.

March 1, 1932. H. C. HARRISON 1,847,181
TALKING MOTION PICTURE SYSTEM
Original Filed Dec. 27, 1923 5 Sheets-Sheet 2

Inventor:
Henry C. Harrison
by Joel C.X. Parmer Att'y.

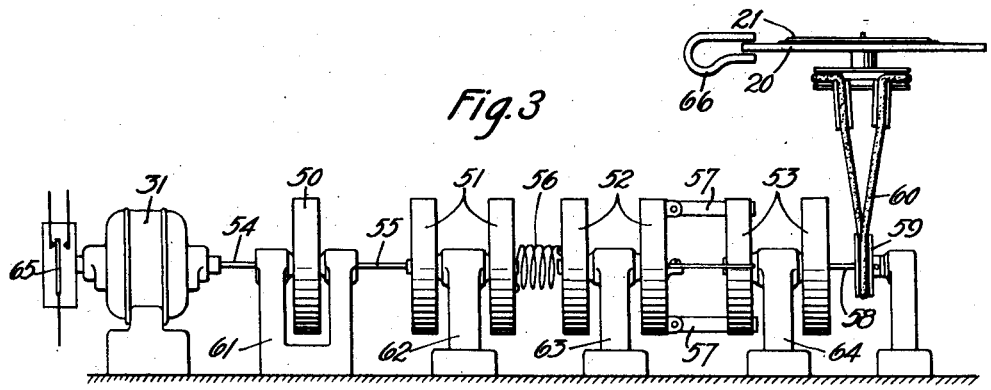
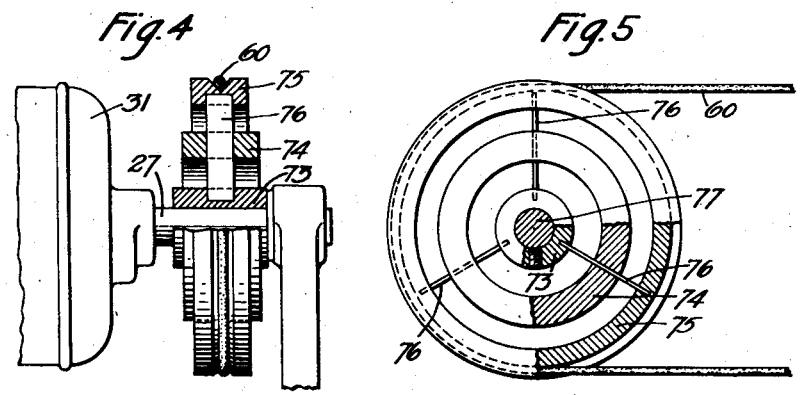
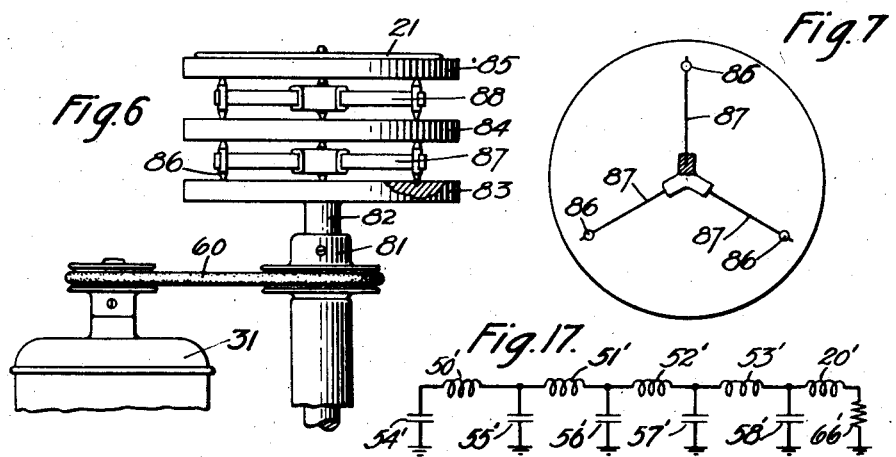

March 1, 1932.  H. C. HARRISON  1,847,181
TALKING MOTION PICTURE SYSTEM
Original Filed Dec. 27, 1923  5 Sheets-Sheet 4
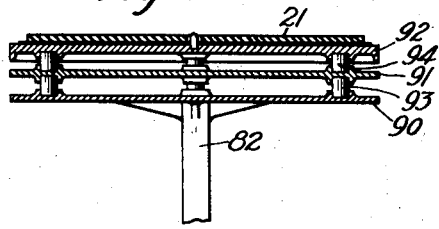
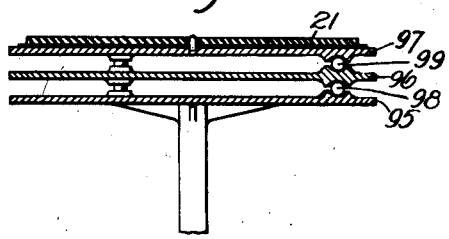
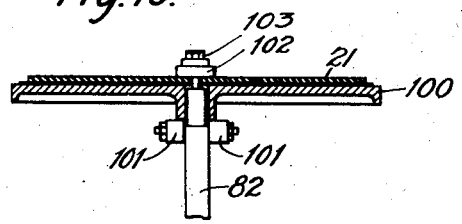
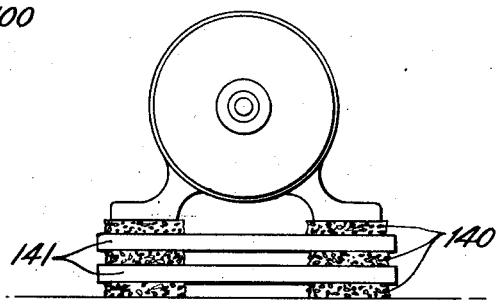
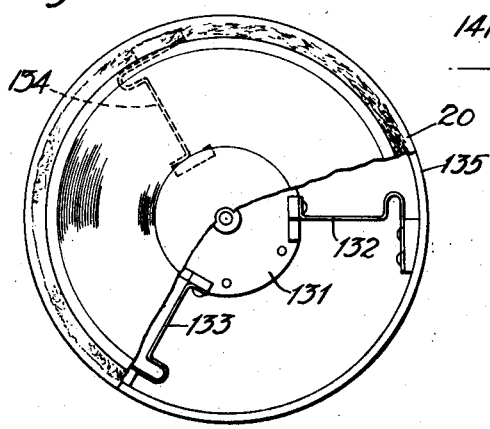
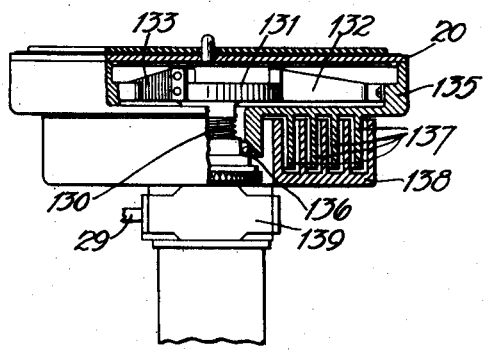
Inventor:
Henry C. Harrison
by *Joel C. R. Palmer* Atty.

March 1, 1932.  H. C. HARRISON  1,847,181
TALKING MOTION PICTURE SYSTEM
Original Filed Dec. 27, 1923  5 Sheets-Sheet 5

Inventor:
Henry C. Harrison
by Jxx Ch. Palmer Atty.

Patented Mar. 1, 1932

1,847,181

UNITED STATES PATENT OFFICE

HENRY C. HARRISON, OF PORT WASHINGTON, NEW YORK, ASSIGNOR TO WESTERN ELECTRIC COMPANY, INCORPORATED, OF NEW YORK, N. Y., A CORPORATION OF NEW YORK

TALKING MOTION PICTURE SYSTEM

Continuation of application Serial No. 682,855, filed December 27, 1923. This application filed May 26, 1926. Serial No. 111,707.

This invention relates to mechanical transmission systems and more particularly to the application of such systems to motion picture and phonograph apparatus.

The present application is a continuation of application, Serial No. 682,855, filed December 27, 1923.

An object of this invention is the prevention of the transmission of objectionable vibrations from the driving means or other sources to certain parts of the apparatus.

Another object is to enable the driving of photograph and phonograph apparatus in synchronism and at a uniform angular speed irrespective of minor speed fluctuations in the driving motor.

A further object is the prevention of modulation of the speech or music frequencies, by extraneous vibrations of such frequencies that the resulting modulated frequencies are within the audible range and appear either as distinct additional frequencies or as "beat tones".

A feature of this invention is the combination of driving and driven members coupled by a mechanical transmission line comprising a mechanical filter having a cut-off frequency sufficient to suppress objectionable vibrations from transmission from one member to another.

Another feature is a phonograph turntable drive in which the turntable is connected to its driving shaft through a mechanical filter.

Another of the features is a fluid damping arrangement for suppressing vibrations in the driven member.

A further feature is the mounting of the motor and other parts of the apparatus on a mechanical filter comprising laminations alternately composed of elastic members such as damped springs, rubber, cork, felt or the like, and masses of heavy material such as metal plates.

A still further feature is a novel arrangement of a multi-layer gear for driving the turntable and for preventing inaccuracy in the gear from effecting the angular constancy of rotation of the turntable, and from generating low frequency vibrations.

While this invention is broadly applicable to various devices its application to talking motion picture systems is particularly described herein.

In recording or reproducing speech and music by phonograph apparatus extraneous vibrations may cause interference or distortions due to the direct introduction of disturbing frequencies or by modulation of the speech and music frequencies. Both types of interference are possible since most phonograph apparatus possess decided modulating characteristics as well as those of direct transmission. If the disturbing vibrations are within the audible range then both their direct and modulating action cause the addition of audible frequencies, which constitute interferences which are sometimes generally designated as distortions. For example, a disturbing frequency of 200 cycles per second modulating a speech and music frequency of 800 cycles would, as is well known, result in frequencies of 800 minus 200 or 600 cycles and of 800 plus 200 or 1000 cycles in addition to the direct 200 and 800 cycle frequencies. All four frequencies lie in the audible range. The 200 and the 800 cycle frequencies would have a loudness substantially proportional to the energy at which they were introduced; and the frequencies resulting from modulation, namely, the 600 and the 1000 cycle frequencies a loudness depending upon both the energy of the incoming frequencies of which they are the result and the modulating characteristics of the apparatus. Obviously the 200, 600 and 1000 cycle frequencies would be discordant and hence would produce a very undesirable result. If the disturbing vibrations are below or above the sensible audible range the direct action is of little consequence but the action of modulation may be serious when the resulting frequencies are within the audible range. Even frequencies of a few cycles per second, which are far below the audible range, cause modulated frequencies having a difference of only a few cycles from the speech and music frequency and are consequently not directly discernible as interfering frequencies but they cause very noticeable quality distortions appearing as "beat tones" or fluctuations in volume varying over a decidedly objectionable range. One of the important features of this invention comprises means for preventing distortions due to modulation and in carrying this out low-pass filters are used in the coupling between the phonograph and the other parts of the apparatus. The filtering apparatus prevents substantially all extraneous vibrations of from a very few cycles per second to even as low as a fraction of a cycle per second from reaching the phonograph apparatus.

In talking motion picture apparatus of the type under consideration a number of disturbing frequencies depending upon the set up of the mechanism are outstanding, such as, 24 cycles per second from the Geneva gear on the projector operating at 24 pictures per second, 20 cycles per second from the driving motor operating at 1200 R. P. M., 40 cycles per second from the double thread worm having a ratio of 36 to 1 driving the phonograph apparatus which is operated at 33⅓ R. P. M., and 0.555 cycle per second due to eccentricity of the worm gear which drives the phonograph turntable. These disturbing frequencies are either below the audible range or in the region where the ear is insensitive and it is therefore obvious that the disturbances which they might set up would be primarily due to modulation of the speech and music frequencies. The mechanical filters used in this invention ahead of the turntable, have a cut-off frequency of a fraction of a cycle per second and their action is therefore such as to substantially eliminate the bad effects of the disturbing frequencies, even the lowest above mentioned which is 0.555 cycle per second.

In accordance with one form of this invention the coupling arrangement between the driving and the driven members, by means of which the above objects of this invention are accomplished, comprises a mechanical network of a plurality of sections designed to suppress vibratory energy above a certain critical frequency while transmitting zero frequency, namely, continuous motion. Such a network may comprise a plurality of rotating masses coupled by elastic means in a manner similar to an electric low-pass filter composed of a plurality of sections each section comprising inductance in series with the line and capacity in shunt to the line as described and claimed in the U. S. patent to Campbell No. 1,227,113, May 22, 1917. The corresponding quantities in the mechanical and electrical systems as explained by the applicant in the Journal of the American Institute of Electrical Engineers of March 1926 are as follows:

| Mechanical | Electrical |
|---|---|
| Force, F | Voltage, E |
| Velocity, $v$ | Current, $i$ |
| Mass, $m$ | Inductance, L |
| Compliance, $c$ | Capacity, C |
| Impedance, $z$ | Impedance, Z |
| Resistance, $r$ | Resistance, R |

The only one of the terms not in common usage and hence needing special definition is compliance, popularity known as flexibility. It is measured in terms of the amount a spring bends under applied force. Another way of quantitatively specifying this property of a spring is, in terms of the force required per unit of deflection, which is the elasticity. As thus defined, the elasticity is the reciprocal of compliance. If in a mechanical network the masses are effectively in series with the mechanical transmission line and the compliances or elastic members are effectively in shunt to the line, the masses and compliances may be assigned such values as to suppress substantially all vibratory energy above a definite cut-off frequency given by the equation $$f_c = \frac{1}{\pi}\sqrt{\frac{1}{cm}}$$

wherein $f_c$ is the cut-off frequency, $c$ is the compliance of a section in centimeters per dyne and $m$ is the mass in grams of a section.

In mechanical systems as in electrical systems impedance is defined as the ratio of force to velocity $F/v$ or $E/i$, respectively. The well known formula for the zero frequency impedance of an infinite electrical network is $$z_0 = \sqrt{\frac{L}{C}}$$

From the analogous properties of mechanical and electrical networks it can readily be seen that the zero frequency impedance of such a mechanical network, when properly terminated, is given by the equation $$z_0 = \sqrt{\frac{m}{c}}$$

The sections may be built of either vibrating or rotating members. If the members are rotating members by "mass" will be meant the equivalent mass in grams at one centimeter from the axis of rotation, and by "compliance" the equivalent compliance in centimeters per dyne at one centimeter from the axis of rotation. Two sections may be coupled together through some lever system which increases or decreases the velocity of vibration and acts as a transformer. If a vibrating system is coupled to a rotating system at a distance of one centimeter from its axis of rotation, it will be considered to be coupled on a one-to-one transformer basis, and if connected at two centimeters, the transformer ratio will be two-to-one, that is, the forces will be stepped up in the ratio of two-to-one. Two transmission systems connected to the two sides of a transformer should have impedances proportional to the square of the ratio of the forces on the two sides.

In rotating systems, a continuous rotation is analogous to a continuous electrical current, and fluctuations in the speed of rotation are therefor analogous to superimposed alternating currents. If it is desired to prevent substantially all speed vibrations from reaching the driven member so that it will rotate at a constant average speed, the cut-off frequency of the network must be below that of the lowest disturbing frequency vibration, of the order of a fraction to a few cycles per second. The masses and compliances must be given such relative values as to make the critical frequency in the above equation have the desired low value.

Some of the general features of the invention have been broadly outlined above. Further objects and features will appear and a better understanding of typical embodiments will be had from the following detailed description in connection with the accompanying drawings. Referring to the drawings:

Fig. 3 illustrates a form of coupling between the motor and the phonograph turntable.

Figs. 4 and 5 illustrate a modification of Fig. 3, in which the masses of the coupling arrangement are concentrically arranged and are shown as side and end views respectively.

Figs. 6 and 7 also illustrate a modification of Fig. 3 in which the masses comprise circular plates supported one above the other and are shown as side and end views, respectively.

Figs. 8 and 9 illustrate a further modification of Fig. 3 in which the masses comprise circular plates supported one above the other upon elastic members, such as rubber or steel balls, respectively.

Fig. 10 illustrates a further modification and simplified turntable.

Figs. 11 and 12 illustrate a still further modification of the coupling arrangement in which oil damping is employed, and are shown as side and end views, respectively.

Figure 13:
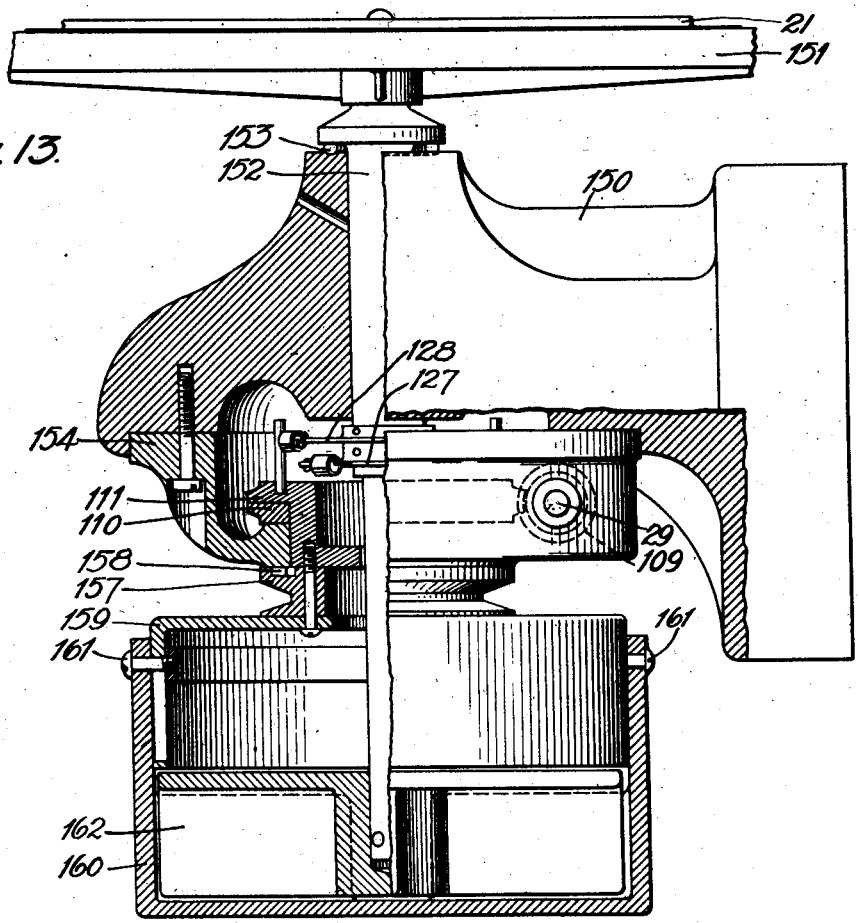
Figure 14:
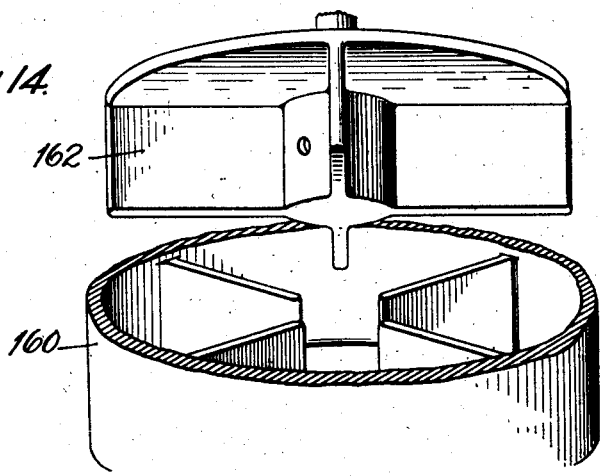

Figs. 13 and 14 illustrate another modification of the coupling arrangement in which fluid damping is employed and are shown as side and partial end views, respectively.

Figure 15:
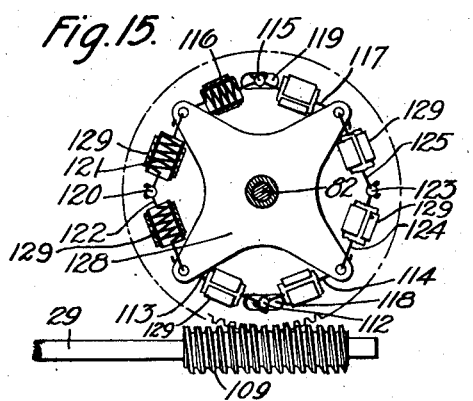
Figure 16:
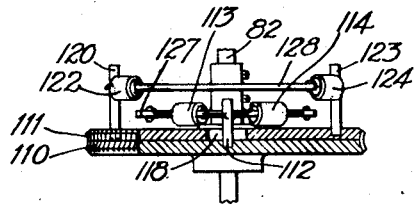

Figs. 15 and 16 show side and edge views of a special multi-layer worm gear.

Fig. 17 illustrates an electric filter the operation of which is similar to the mechanical filters shown in Figs. 3 to 14, respectively.

Fig. 18 is a general view of a mechanical filter for supporting a motor or other parts of the apparatus.

Figure 19:
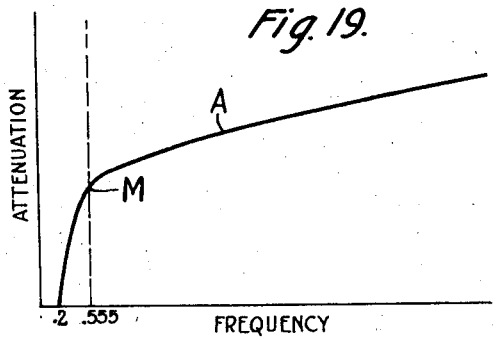

Fig. 19 is a curve of frequency and attenuation of the turntable filter, and

Figure 20:
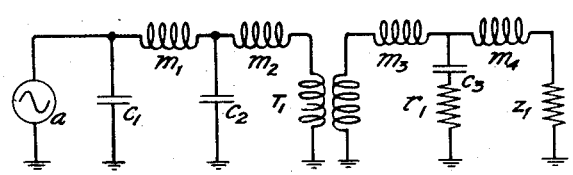

Fig. 20 illustrates an electrical filter, the operation of which is similar to that of the mechanical filters from the driving motor to the phonograph turntable.

Where similar reference characters appear they designate similar parts in the different drawings.

Figure 1:
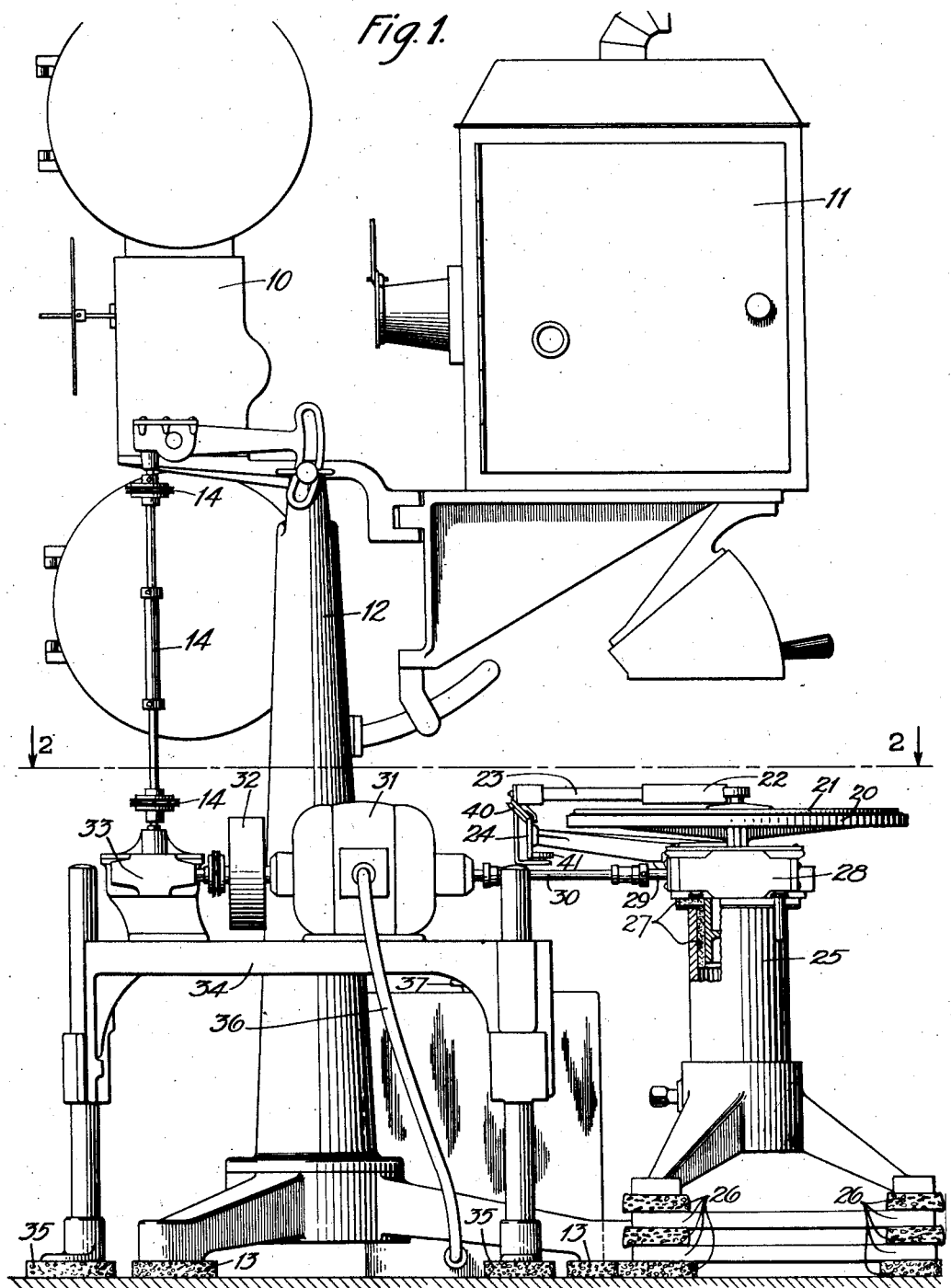
Fig. 1 is a side view of a general combination of motion picture projector and phonograph turntable.
Figure 2:
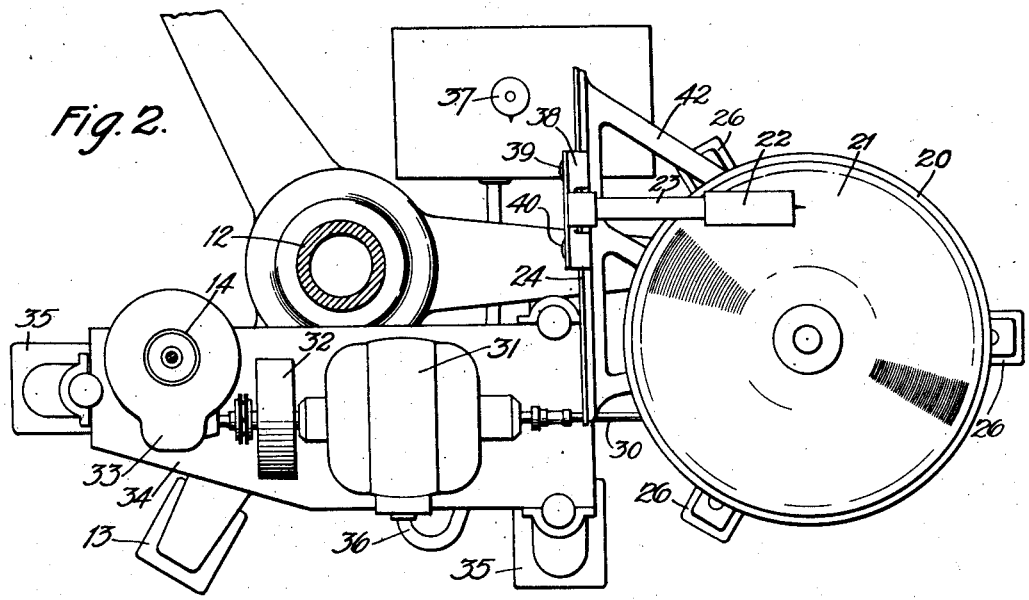
Fig. 2 is a view looking down on the projector and phonograph turntable as shown in Fig. 1 below the plane 2—2.

Figs. 1 and 2 illustrate one application of this invention comprising the general combination of motion picture projector and phonograph turntable and show the mechanical filters intercoupling the several parts of the apparatus. A standard projector, the main parts of which are designated by 10, 11 and 12, is supported by the comparatively rigid filters 13 under its base and coupled to the driving motor by means of the special flexible rotating coupling member 14. All of the projector apparatus may be of a standard make and its association with the phonograph apparatus and driving motor is through the supporting filters 13 and the special rotating coupling member 14. The phonograph is shown by the turntable 20, the record 21 resting on a thin layer of felt, the reproducer 22, the reproducer supporting arm 23, the mounting member 24 for supporting the reproducer arm and the main supporting frame 25 which in turn rests upon the multi-layer filters 26 consisting of alternate layers of elastic material and of hard heavy material. The turntable is further freed from floor vibration by the cushioning or filtering member 27 which may be of such elastic material as soft rubber or felt separating the metal of the main base 25 from the metal directly above and in contact with the members operating the turntable 20. The turntable is rotated through a worm and worm-gear and intervening filter connections within the housing 28, details of which are shown in subsequent figures. The worm is driven by the shaft 29 which in turn connects through the special coupling 30 with the motor 31. This coupling may consist of two short sections of tubular rubber one making connection with the motor shaft and the other with shaft 29 and both interconnected by a light metal tubular shaft. A fly wheel 32 is directly mounted on one end of the motor shaft to aid in making the rotation more uniform. The motor 31 also drives the motion picture projector through a worm and worm-gear mounted in housing 33, the worm-gear of which connects with the shaft running to the special coupling member 14. The motor 31 is mounted upon the supporting framework 34 which in turn is supported on the filtering members 35. The electric cable 36 connects the motor with the controller 37.

Referring particularly to Fig. 2 the phonograph reproducer 22 mounted on the arm 23 is supported upon the straight track 24 through the carriage 38 which has three wheels 39 and 40 engaging the left and top edges and 41 the lower right side of the track 24. This track is supported by the bracket 42 fixed to the gear housing 28. The general arrangement for supporting the reproducer is such that the stylus travels from the inner circumference of the phonograph record towards the outside along a radial line as is obvious from the mounting arrangement just described. The carriage 38 and the track 24 are so designed that there is a minimum amount of friction between the carriage and the track and the carriage so rests upon the track that the arm 23 is entirely supported and therefore causes no variation in contact pressure of the stylus upon the record. Upon placing a film in the projector and a record upon the phonograph turntable both of which have been made to operate together, it is obvious that with the arrangement for interconnection of the various apparatus above described reproduction can be effected provided uniform rotation is secured and disturbing vibrations are eliminated from the system. Such undesirable vibrations are eliminated and uniform rotation is secured by the several special filtering connections already referred to. The details of the various filters which may be used for coupling the phonograph apparatus with the other elements of the system and a description of their operation follows.

Referring to Fig. 3, the turntable 20 of a phonograph instrument is disclosed and is arranged to be rotated by an electric motor 31 having a constant average speed but which may vary between definite maximum and minimum values. Such a motor may comprise, for example, a centrifugally controlled contact 65, which operates in connection with the field winding to maintain the speed between a certain maximum and minimum value.

Fluctuation of the speed of the motor between the upper and lower limiting values is frequently objectionable when the motor is employed, particularly for driving the turntable of a phonograph recorder, for the speed of rotation of the turntable should be held as nearly constant as possible to prevent distortion of the sounds recorded or reproduced.

This invention provides a coupling means between the motor and the turntable which enable fluctuations in the speed of the motor between the upper and lower limiting values to be substantially suppressed, with the result that the turntable is rotated at a substantially constant speed equal to the average speed of the motor. The coupling arrangement comprises a plurality of serially coupled masses 50, 51, 52 and 53, coupled by suitable elastic means. These elastic means serve as shunt compliances. An elastic rod 54 is employed for coupling the motor 31, the mass 50; a similar elastic rod 55 couples the mass 50 to the mass 51; a helical spring 56 connects mass 51 to mass 52; while a plurality of elastic straps 57 connects masses 52 and 53 near their periphery. An elastic rod 58 similar to rods 54 and 55 connects the mass 53 to the pulley 59, which, by means of the belt 60, rotates the turntable 20. The mass 50 comprises a single fly wheel mounted on a shaft supported in a suitable manner by the support 61. The manner of support should, preferably, be one in which friction is small but it is important that it be very nearly uniform since any variations in friction give rise to vibratory forces. Masses 51, 52 and 53 each comprise two flywheels mounted on shafts suitably supported by supports 62, 63 and 64, respectively. The system is terminated by a mechanical resistance produced by the magnet 66 including eddy currents in the edge of the conducting disc 20. Fluid damping such as is described later is applicable for producing the terminating resistance and other means may be used. The elastic members 55, 56 and 57 have been shown of different types in order to illustrate various forms and may be used interchangeably. The compliances in the mechanical filter coupling means shown in Fig. 3, may be obtained from only one of the types of elastic members shown. Also some of the masses 50 and 51 have been shown by different types to indicate that this feature is not limited to a form in which each rotating mass comprises a single unit.

Such a coupling arrangement as that just described is analogous to an electric low-pass filter of a plurality of sections, each section comprising inductance in series with the line and capacity in shunt to the line since the masses are connected effectively in tandem for the transmission of motion along the coupling and since adjacent masses are coupled solely by elastic means. There is substantially no attenuation for continuous motion, namely, zero frequency, or for any frequency that it is desired to transmit up to a definite cut-off frequency. Frequencies above the cut-off, however, are substantially suppressed. This arrangement may therefore be termed a mechanical low-pass filter of a plurality of sections, each section comprising a mass in series with the line and an elastic compliance in shunt to the line.

If it is desired that the coupling arrangement should eliminate substantially all fluctuations in the speed of the motor 31, when it departs from its constant average speed, the masses 50 to 53 and the elasticities 54 to 58 should be given such values that the cut-off frequency given by the equation $$f_c = \frac{1}{\pi}\sqrt{\frac{1}{cm}}$$

previously discussed is a fraction or only a few cycles per second. It is also preferable to terminate the line by its zero frequency impedance $$z_0 = \sqrt{\frac{m}{c}}$$

and to make the value of the last filter section one half that of a normal section, that is, to terminate the mechanical filter at midsection so that the impedance of the filter can be made to closely approximate a constant resistance at frequencies below the cut-off frequency.

The electrical arrangement of inductances and capacities which is similar to the masses and compliances of the mechanical coupling of Fig. 3 and also to those subsequently disclosed herein, is shown in Fig. 17, which discloses a low-pass electric filter of a plurality of sections, each section of which comprises an inductance in series with the line and a capacity in shunt to the line. The inductances 50' to 53' and 20' correspond to the masses of Fig. 3 and the capacities 54' to 58' correspond to the elastic coupling means of Fig. 3. The resistance 66' corresponds to the mechanical resistance caused by the eddy current losses produced by the magnet 66 acting on the conducting disc 20. The mass of the disc 20 is represented by the inductance 20'. This analogy can be clearly seen from a consideration of the action of the two systems. In the electrical system a voltage impressed on one set of terminals of the network causes a current to flow through the system. The voltage across the line is the same on both sides of the shunt element, such as 54', while the current on the two sides may be different, due to the shunting action of the condenser 54'. Similarly in the mechanical line a force impressed on the system gives it a certain velocity. The same force is applied to the system at both terminals of a shunt element, such as 54, while the rotational velocity at the two terminals of the element may be different. In the electrical line the same current is flowing in the system at both terminals of a series element, such as 50', while the voltage across the line at the two terminals of the element may be different. Similarly, in the mechanical line the transmission has the same velocity at both sides of a series element, such as 50, while the force at these two points may be different due to the mass or inertia reaction of 50. In the mechanical line, the elasticities 54 to 58 do not function to change the velocity as long as it remains continuous in the same manner as the shunt condensers 54' to 58' do not have any effect on the direct current. In like manner, the masses 50 to 53 and 20 do not change the force of a continuous velocity in the same way as the inductances 50' to 53' and 20' do not offer any reactive impedance to the direct current. Of course, for all frequencies above the cut-off the mechanical filter functions due to the periods of oscillation of the elements, to merely change the phase relation of the velocity and force and not to affect their absolute values in the same way as an electrical filter functions with respect to current and voltage.

The masses 50 to 53 and 20 of Fig. 3 may be made of any desired material, such as iron and the elasticities 54 to 58 may be of any elastic material which for the length and thickness or diameter disclosed, posseses the proper elasticity per unit section of the mechanical filter. A certain amount of mechanical resistance is necessary to quickly suppress the oscilations which are set up when the apparatus is started or stopped or when speed changes occur, that is to quickly suppress transient oscillations, and can be introduced by using elastic materials of high internal friction or by adding damping elements such as are shown in Figs. 11 to 16 inclusive.

The coupling arrangement disclosed in Figs. 4 and 5 is similar to the arrangement of Fig. 3 except that the masses of 73, 74 and 75 are annular rings coupled solely by a plurality of elastic strips 76. The inner annular ring 73 is rigidly fastened to the shaft 77, which is coupled to the motor 31, while the outer mass 75 acts as a pulley for the belt 60 leading to the turntable or other device to be rotated by the motor. Such an arrangement comprises a mechanical filter of a plurality of sections, each section comprising a series mass and a shunt compliance, and the effective masses of the annular rings 73, 74 and 75 and the combined effective compliances of the strips 76 may be made such that the member driven by the belt 60 will be rotated at a speed equal to the constant average speed of the motor 31.

Figs. 6 and 7 disclose the coupling arrangement of this invention in modified form in which the motor 31 is coupled to a pulley 81 on a vertical shaft 82 by means of a belt 60. Mounted on a shaft 82 is a disc 83 which acts as the first mass of the low-pass filter. This mass is coupled to the second horizontal disk 84 by elastic means shown more in detail in Fig. 7. A plurality of double pointed pins 86 projected into cone-shaped depressions in the lower face of disk 84 and the upper face of disk 83, and these double pointed pins are suitably coupled to each other by elastic strips 87. Mass 84 is therefore driven by mass 83 through the intermediary of an elastic coupling means produced by the elastic strips 87. A similar elastic means couples the disk 84 to the next disk 85 which is covered with a thin layer of felt or the like and carries the phonograph record 21. The mechanical filter for enabling the motor 31 to rotate the record 21 may be of any desired number of sections similar to that disclosed and the masses 83, 84, and 85 and the compliances 87 and 88 may be assigned such values that the record 21 is rotated at a constant speed equal to the average speed of the motor 31. The proper matching of the masses and compliances determine the effectiveness of these arrangements.

Figs. 8, 9 and 10 disclose further modifications of a coupling arrangement as covered by this invention particularly applicable to a phonograph turntable. Figs. 8 and 9 are of the multi-disk type similar to that shown in Fig. 6. Mounted on shaft 82 is a disk 90 which acts as the first mass of the low-pass filter. This mass is coupled to a second disk 91 by three or more elastic members 93, made of such material as soft rubber, cork or the like. Mass 92 is mounted above mass 91 by means of a plurality of elastic members 94 in substantially the same manner as mass 91 is mounted above mass 90. A phonograph record 21 is placed upon the top mass 92 with a thin layer of felt intervening. The coupling arrangement shown in Fig. 9 is similar to that shown in Fig. 8 with the exception that the masses 95, 96 and 97 are inter-connected by the elastic members 98 and 99 which are balls of hard material such as steel, held in spherical recesses of somewhat larger radius than the balls. In the preferred form three balls are used in each section. Fig. 10 is a somewhat simpler coupling arrangement. It consists of a shaft 82, a disk or a mass 100 loosely fitting around the shaft and clamped between rubber disks 101 fastened to the shaft below the mass 100 and the rubber washer 102 held by the nut 103 at the top of the shaft. The mass 100 is engaged and positioned by the elastic members 101 and 102, which comprise an elastic element between the shaft and the disc 100. A phonograph record 21 supported on a layer of felt is mounted on the disc 100.

Figs. 11 and 12 show a coupling arrangement in which fluid, such as oil, damping is employed in addition to the masses and compliances. This coupling is driven by a shaft 29 carrying a worm which engages a special worm-gear attached to the hub 130 which carries the disc 131 both rotatable about the same vertical axis. Connected to these masses and directly attached to the disc 131 at equal angular distances apart are a plurality of radial compliances in the form of springs 132, 133 and 134 which in turn are connected with a rotating mass 135. The rotating mass 135 is rigidly connected to the turntable 20 above the elastic connecting members and while rotating at the same average speed as the worm-gear the turntable is free to take a small and varying angular displacement with respect thereto, through the ball bearing support 136. The oil damping arrangement comprises a plurality of rotatable concentric cylinders 137 integral with 135 and positioned in a fixed member 138 comprising a plurality of concentric channels fairly loosely clearing the rotating members 137. The clearance space is filled with oil and the separating layers of oil which are preferably thicker than lubricating films cause the damping. The essential requirement is that the drag of the oil shall be uniform throughout a revolution. The central portion 139 below the fixed oil damping member contains a chamber in which the worm and special worm-gear are housed. The fixed portion of this coupling is supported on a pedestal and connected to the driving motor in a manner such as shown in Figs. 1 and 2.

The oil damping apparatus of Figs. 11 and 12 is placed in such position that it is subject to continuous rotation as well as to vibrations in contrast to that of Figs. 13 and 14 in which the fluid damping device is subject only to vibrations. A simple rubbing surface could not be substituted for the oil damping apparatus of Figs. 11 and 12 with continuous rotation present because the work done with such a rubbing surface is proportional to the pressure and the distance traveled and hence vibrations do not increase the work done and they are not suppressed. Any friction device subject to continuous rotation if it is to suppress vibrations must have a rate of energy dissipation which is proportional to some power greater than the first power of the velocity of motion.

Figs. 13 and 14 show a coupling arrangement in which the masses and elasticities are arranged substantially as in the Figs. 11 and 12 but in which resistance has been eliminated from the oil damping device when the speed is constant. The apparatus is mounted on the main casting 150 which in turn is supported by a suitable pedestal or base on filters similar to those shown in Fig. 1. The turntable 151 upon which the record 21 is placed is mounted on the vertical shaft 152. The downward thrust of this shaft is taken by the bearing 153. At the lower end of the casting 150 is located a housing 154 for enclosing the driving worm and special worm-gear. The worm 109 is mounted on the driving shaft 29 and engages the split layer worm-gears 110 and 111. The worm-gear is concentrically supported by a bearing in the lower end of the casing 154. Connection between the worm-gear members and the shaft 152 is made by means of springs and radial connecting members 127 and 128 in a manner similar to that shown and described in connection with Figs. 15 and 16. The springs form an elastic coupling between the worm-gear and the shaft which it drives. A combined collar and pulley 157 is bolted to the upper half of the worm-gear so as to prevent longitudinal movement of the worm-gear. This collar 157, together with the washer 158 of felt or other suitable material prevents any appreciable leakage of oil from the housing 154. The collar 157 is also used as a belt pulley to drive suitable gearing for moving the recorder or reproducer tone arm across the record. The oil damping apparatus is attached below the combination collar and pulley 157. It is formed of two principal parts both of which rotate at the same number of revolutions per minutes but may at any time have a small angular displacement with respect to each other. The exterior portion of the oil damping device consists of a chamber formed by an upper cylindrical portion 159 and a lower cylindrical portion 160 for containing the oil. These two parts of the chamber are bolted to and rotated by the worm-gear. The lower portion 160 of the chamber may be raised and lowered and is clamped to the upper member 159 by means of the bolts 161. The vertical shaft 152 which carries the turntable is free from direct contact with the worm-gear or the outer portion of the oil chamber but it carries at its lower end a damping member 162 comprising a disc having a number of radial vanes which closely fit within the lower portion 160 of the oil chamber. The lower portion 160 of the oil chamber contains the same number of radial vanes as the member 162, four being shown in the drawing for each member. In this damping device the radial vanes of each member are symmetrically located and symmetrically positioned with reference to each other. The parts are machined so as to have a small clearance. The chamber 160 is filled with oil to above the top of the member 162. When a small angular displacement takes place between the two members 160 and 162, carrying the radial vanes, the oil is forced through the clearance spaces from one section to another between the vanes and thus brings about the desired damping. The proper amount of clearance can be obtained by lowering or raising the member 160 which will increase or decrease the clearance or leakage space between the top and bottom edges of the vanes carried by members 160 and 162, respectively.

In this arrangement the oil damping places no frictional drag on the shaft 152 and is entirely inactive when the angular speed of the worm-gear is constant but upon any sudden increase or decrease in rotation the damping device immediately becomes effective.

The arrangement shown in Figs. 11 and 12 and in Figs. 13 and 14 incorporates the important features of a mechanical low-pass filter which are desirable for recording but are not so necessary for reproducing. For this reason these refinements are not all shown in Fig. 1 which discloses a reproducing assembly though employing substantially the same general principles.

Figs. 15 and 16 show side and edge view of a laminated or multi-layer special worm-gear. This worm-gear has been designed to compensate for certain irregularities inherent in commercial manufacture of a one piece worm-gear and thereby approach in operation the action of a perfectly formed worm-gear. Its design is such that the amplitude of the angular speed variations is decreased and the frequency of vibration set up by the operation of the worm-gear is increased. By decreasing the amplitude and increasing the frequency of such disturbances they can be more readily eliminated by filtering as described in this invention. This worm-gear consists of two or more thin discs which are clamped together and cut simultaneously in the usual manner and then reassembled in an angular relation different from that occupied when cut. The variations in cutting have been found to be cyclic and the best practicable displacement of each layer is a progressive displacement equal to 360 degrees divided by the number of layers. The high spots of one layer will consequently be more or less in alignment with low spots of other sections thus producing a composite worm-gear which on the average will operate more nearly perfectly than a single piece worm-gear unless the single piece worm-gear is manufactured with unusual precision. The reassembled discs are coupled elastically to the shaft which they drive. The action of this multi-layer worm-gear is such that the angular errors in the driving faces of the teeth of the layers are averaged and clamping action on the threads of the worm is avoided. The worm-gear here shown is made up of two layers 110 and 111. More than two layers may be used. The separate layers are each elastically connected to the driving shaft. The lower half of the gear contains two pins 112 and 115 passing through slots 118 and 119 in the upper half 111 of the gear. The upper end of these pins are connected with springs 113 and 114, and 116 and 117 which connect with the star shaped member 127 rigidly fixed to the driven shaft 82. In a similar manner the upper half of the gear contains two pins 120 and 123 carrying springs 121 and 122, and 124 and 125 which connect with the star shaped member 128 to drive the shaft 82. The spring elasticities are damped and the means employed may consist of a wrapping 129 of felt surrounded by a slitted thin elastic metal tube or the like. The slitted tube binding prevents the felt from stretching with the spring and otherwise holds the damping material in position. The use of damping in connection with the helical springs makes possible the use of very light springs which in turn results in a lower frequency cut-off in the filter. The composite worm-gear is rotated by means of worm 109 mounted on shaft 29. It is obvious that this gear arrangement not only provides an elastic coupling between the driving shaft 29 and the driven shaft 82 but also by displacing the layers after cutting averages out any irregularities so as to produce rotation in the driven shaft which is more uniform than could otherwise be obtained unless the gears were perfectly cut. The resultant action of a gear of this type is such that the amplitude of the speed variations or disturbances is decreased and the frequency is increased to a value at which they may be more readily eliminated by the various filtering arrangements shown in this invention. This gear design must not be confused with other types of split or multi-layer gears old in the art and which were designed to avoid backlash and take up wear.

The coupling arrangement shown in Figs. 3 to 14 may be used, for example, in the apparatus employed in recording or in reproducing talking movies. In such apparatus the motor 31 may be used as a common drive for both the phonograph and the photograph apparatus. The gearing and filtering arrangements are obviously applicable to other devices where the resulting speed refinements are required.

Fig. 17 diagrammatically shows the interrelations of the masses and the compliances or elastic members, of the various mechanical coupling arrangements or filters, from the standpoint of mechanical wave energy transmission as described and shown in connection with Figs. 3 to 14. A description of this diagram, which may be viewed as a general electrical circuit analogy of the mechanical arrangement, follows that of Fig. 3 and reference to it will make clear the general features underlying all of the several mechanical modifications herein described.

Fig. 18 shows a simple low pass filter of a type which may be used under footings of a motor or a pedestal such as is shown in Fig. 1 under the legs of the turntable pedestal. This filter consists of a plurality of compliances 140 made of elastic material, such as felt, cork, soft rubber or damped springs, and a plurality of masses 141 made of metal or some other heavy material.

Fig. 19 is a frequency attenuation curve of the turntable filters, such as shown in Figs. 1 and 2. It shows the point M, on the curve A, representing a frequency of slightly over a half a cycle per second well up on the curve. A filter having a characteristic as shown by curve A will obviously cut out substantially all high frequencies and allow those of a fraction or at most those of a few cycles per second to pass. It is therefore obvious that a mechanical filter coupling positioned between a common driving motor and a phonograph turntable, for example, would prevent the transmission of disturbing frequencies of a range above that transmittable by the filter. This results in eliminating substantially all vibrations other than those impressed on or reproduced by the phonograph record from effecting the recording or reproduction of music or speech.

Fig. 20 shows how the masses, compliances and mechanical resistances are related to one another from the standpoint of mechanical wave energy transmission, all of these being shown by a diagram which has the form commonly used for electrical circuits. This similarity is due to the fact that wave energy follows the same laws in the mechanical and in the electrical field, and that mechanical mass is analogous to electrical inductance, mechanical compliance is analogous to electrical capacity, and mechanical resistance is analogous to electrical resistance. The diagram relates to the combined turntable drive and filtering mechanism substantially as shown in Figs. 11 and 12 and Figs. 13 and 14.

The main source of vibrations $a$, is from the motion picture machine. Between this and the driving motor there is an elastic coupling $c_1$ which acts as a shunt compliance. The motor also is to some extent a source of vibrations. The motor armature and flywheel act as a series mass $m_1$ and these are coupled to the worm-gear through an elastic coupling $c_2$ which acts as a shunt compliance. The worm-gear acts as a transformer $T_1$ with the mass $m_2$ of the worm acting as a series mass on the primary side and the mass $m_3$ of the worm-gear acting as a series mass on the secondary side. The worm-gear is coupled to the turntable through a flexible coupling $c_3$ which acts as a shunt compliance. In the shunt branch with $c_3$ is a mechanical resistance $r_1$ caused by the damping action introduced between the worm-gear and the turntable. The turntable $m_4$ acts as a series mass. Between the turntable and the mounting frame and terminating the whole network is a mechanical impedance $z_1$. The elements $m_4$ and $c_3$ are designed to suppress all disturbances above 0.2 cycle per second, and the damping action of $r_1$ suppresses all transient disturbances of a frequency below 0.2 cycle per second.

In Figs. 11 and 12 the value of $r_1$ is relatively small and that of $z_1$ relatively large, while in Figs. 13 and 14 the value of $r_1$ is relatively large and that of $z_1$ relatively small.

It is obvious that a system of this character whether mechanical or electrical is capable of filtering out or eliminating substantially the whole of all vibrations above a certain frequency. In either case it is, however, important to appreciate what elements must be incorporated in the system, the relationship which must exist between the parts, and the mass, compliance, or resistance value of each part as required in a system of this character to meet the requirements imposed. Modification of both the detail arrangement and the characteristic values of the elements may, of course, be employed to reach any desired result.

The invention disclosed herein is obviously susceptible to various modifications and adaptations without departing from the scope and spirit of the invention and it is not intended to limit the invention to the specific construction herein shown and described except as defined by the scope of the appended claims.

What is claimed is:

1. In a sound recording or reproducing device, a record drive comprising a turntable, a flywheel member adapted to rotate on the same axis with said turntable, a driving motor coupled to said flywheel member, and a spring coupling between said flywheel and said turntable, the masses of said turntable and said flywheel member and the compliance of said spring coupling being sufficiently large to prevent the transmission from the motor to the turntable of periodic angular oscillations of a period less than about one second.

2. A phonograph record drive comprising a turntable adapted to receive a record, a flywheel member mounted to rotate on the same axis with said turntable, a driving motor coupled to said flywheel member, a spring coupling between said flywheel and said turntable, and fluid friction means for damping transient oscillations of said turntable.

3. The combination of the system set forth in claim 1 with fluid friction means for damping trancient oscillations of the turntable.

4. A phonograph record drive comprising a turntable, a flywheel member adapted to rotate coaxially with said turntable, a driving motor coupled to said flywheel member, a spring coupling between said flywheel and said turntable, and means for providing fluid friction between said flywheel and said turntable whereby transient angular oscillations of the one relative to the other are damped.

5. A phonograph record drive in accordance with claim 4 in which the flywheel member comprises an oil chamber, and in which the turntable is mounted on a shaft extending into said oil chamber, and having transverse vanes at the end thereof whereby damping is effected.

In witness whereof, I hereunto subscribe my name this 22 day of May, A. D. 1926.

HENRY C. HARRISON.